United States Patent Office 3,544,655
Patented Dec. 1, 1970

3,544,655
ALKYLENE OXIDE COPOLYMERS WITH 0.01 TO 2.0 PERCENT OF A POLYEPOXIDE
Llewellyn D. Booth and Ralph R. Langner, Lake Jackson, Tex., assignors to The Dow Chemical Company, Midland, Mich., a corporation of Delaware
No Drawing. Filed July 8, 1968, Ser. No. 743,051
Int. Cl. C08g 45/00
U.S. Cl. 260—830                                6 Claims

ABSTRACT OF THE DISCLOSURE

Polyalkylene oxide elastomers are produced in the copolymerization of monomeric alkylene monoepoxides and small amounts of a compound containing a plurality of epoxide groups. The elastomeric copolymers thus formed are solid, branched or partially cross-linked and are easily compounded on the conventional rubber-processing equipment to a vulcanizable mixture. The physical properties of the cured elastomeric copolymers do not differ substantially from the physical properties of the correspondingly cured alkylene oxide elastomer wherein the polyepoxide component is deleted. Accordingly, they have the same elastomeric utility.

BACKGROUND OF THE INVENTION

Many alkylene oxide polymers and copolymers have been previously reported along with the catalyst and reaction conditions necessary to induce the polymerization reaction, e.g. organometallic compounds and metal salts are common classes of catalytic reagents to this reaction and autogenous pressures and temperatures between 80-150° C. are common reaction conditions. The polymeric materials thus produced have frequently been viscous liquids or waxy solids of low viscosity, as measured by the Mooney viscometer. The solid material did not adapt itself to common rubber-working techniques and equipment, i.e. the polymers tended to liquefy when hot and stick to the rolls of a roll mill and to the blades of a Banbury mixer. Accordingly compounding the elastomers with curing agents, carbon blacks, antioxidants, etc. to produce a vulcanizable mixture has been a continual problem for those who would produce such elastomers commercially.

SUMMARY OF THE INVENTION

It has now been discovered that copolymerization between small amounts of a compound containing a plurality of epoxide groups, hereinafter a polyepoxide, and a monomeric alkylene monoepoxide, or a mixture of such monoepoxides, results in a polyalkylene oxide elastomer of sufficiently high viscosity that it can be duly processed on conventional rubber-processing equipment.

The polyepoxide concentration in this invention varies inversely with the molecular weight of the polymer produced without the polyepoxide component. A polyepoxide concentration in the copolymer of about 0.01 to 2 percent by weight is suitable and about 0.01 to 1 percent by weight is preferred. At higher concentrations, the copolymer tends to become hard and brittle during processing in the Banbury mixer, thereby necessitating the use of plasticizers. Likewise, at higher concentrations, the elastomeric properties of the vulcanized copolymer, such as modulus-tensile-elongation, tend to be lower than the vulcanized polymer without the polyepoxide component. At the preferred concentration range, no adverse effect on the elastomeric properties of the vulcanized copolymer is observed.

Suitable polyepoxide compounds may be any alkyl, cycloalkyl, alkaryl, dialkyl ether or diaryl ether compound that comprises at least two epoxide groups. Preferred polyepoxide compounds are those comprising two terminal epoxide groups. Examples of suitable polyepoxides include diglycidyl ether, vinylcyclohexene diepoxide, dicyclopentadiene diepoxide, 2,3-dibromo-1,4-diglycidyloxybutane, butadiene diepoxide, pentadiene diepoxide, the diglycidyl ether formed when epichlorohydrin and alkali are reacted with a polyglycol, such as polypropylene glycol or polyethylene glycol, and has the formula

wherein A is glycidyl, B is hydrogen, methyl or ethyl and $x$ is 1-20 and, the diglycidyl ether of bisphenol A, which has the formula

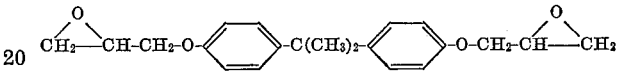

and may be those compounds containing multiple epoxide groups such as compounds of the formula

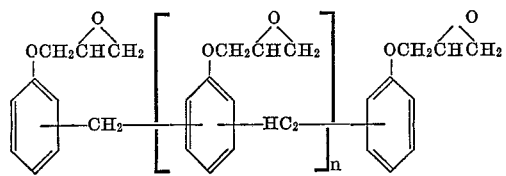

which are epoxylated novolac resins wherein $n$ has an average value of about 0.2 to 2 and preferably is between 1.5 and 2, and other similar polyepoxide compounds.

The monomeric alkylene monoepoxides useful in this invention are any polymerizable vicinal epoxide such as propylene oxide, epichlorohydrin, butylene oxide, styrene oxide, allyloxypropyl glycidyl ether, allyl glycidyl ether, other ethylenically unsaturated glycidyl ethers and mixtures thereof. The unsaturation is needed for conventional sulfur vulcanization.

The polyepoxide is present only in small quantities and acts as a chain-extending and/or cross-linking agent; accordingly, the physical properties of the vulcanized copolymer are substantially those of the polymers without the polyepoxide component. And, since the polyepoxide has the same reactive group as the alkylene monoepoxide monomers, i.e. the epoxide linkage, the copolymerization proceeds under the same reaction conditions and utilizes the same catalyst known heretofore in the art.

SPECIFIC EMBODIMENT

The following examples further illustrate the invention:

Examples 1–12

To a reaction vessel was charged 1800 g. of hexane, 440 g. of propylene oxide, 240 g. of epichlorohydrin and 120 g. of allyloxypropyl glycidyl ether. After mixing, twelve 200 g. aliquots were taken. To each aliquot was added with stirring 0.5 g. of 2,6-di-tertiary-butyl-4-methylphenol, 0.135 g. of H$_2$O, 1.47 g. of 2,4-pentanedione and 0.0, 0.1, 0.2, 0.3, 0.4, 0.6, 1.0, 2.0, 3.0, 4.0, 6.0 and 8.0 g. of diglycidyl ether respectively. After the ether had been added, 12 g. of 20% triethyl aluminum in hexane was added to each aliquot with stirring. The reaction vessels containing the samples were capped and held at 80° C. for 20 hours. The samples were cooled to room temperature and the hexane was flashed off under reduced pressure. The resulting elastomers were then compounded in a Banbury mixer according to the following recipe:

| | Parts by weight |
|---|---|
| Polymer | 100.0 |
| Stearic acid | 2.0 |
| LM SRF United 20 carbon black | 50.0 |
| Zinc oxide | 5.0 |
| Sulfur | 2.0 |
| Methyl Tuads tetramethyl thiuram disulfide | 1.0 |
| Captax 2-mercapto benzothiazole | 0.5 |
| Dibutoxyethyl phthalate | 2.0 |

After mixing in the Banbury and milling, the polymers were vulcanized into a sheet 0.08″ thick with a ram force of 30,000 p.s.i. at 320° F. for 30 minutes. Tensile testing strips were cut therefrom and tested on a Tinius-Olson tensiometer.

TABLE I

| Example No: | Diglycidyl ether, grams | 300% mod. | Tensile p.s.i. | Percent elong. | Shore hard. | $ML_{1-4}$ at 250° F. |
|---|---|---|---|---|---|---|
| 1 | 0 | 835 | 1,405 | 520 | 60 | 70 |
| 2 | 0.1 | 1,130 | 1,435 | 525 | 61 | 80 |
| 3 | 0.2 | 1,525 | 1,525 | 300 | 68 | |
| 4 | 0.3 | 1,515 | 1,740 | 350 | 66 | 122 |
| 5 | 0.4 | | 1,410 | 250 | 70 | 116 |
| 6 | 0.6 | | 1,250 | 240 | 68 | |
| 7 | 1.0 | 800 | 1,130 | 500 | 60 | 106 |
| 8 | 2.0 | 520 | 560 | 400 | 62 | |
| 9 | 3.0 | 320 | 320 | 300 | 58 | |
| 10 | 4.0 | 420 | 420 | 300 | 52 | |
| 11 | 6.0 | 330 | 330 | 300 | 56 | |
| 12 | 8.0 | 300 | 300 | 300 | 54 | |

Sample number 1 above was "sticky" on the roll mill while samples 2–8 exhibited good processing characteristics.

Examples 13–17

Using the same ratio of monomers as in Examples 1–12, except that the diglycidyl ether was replaced with 0, 0.01, 0.02, 0.03 and 0.04 percent of the diglycidyl ether of polypropylene glycol, which was a compound of the structure

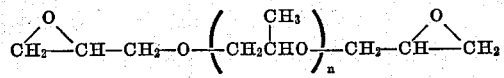

wherein n was 8–10, and the epoxide equivalent weight was 305–335. The reaction time was 18 hrs. at 80° C. The polymers were compounded as per the recipe in Examples 1–12 above, except FEF carbon black replaced the SRF carbon black and no dibutoxyethyl phthalate was added, and were then cured 20 min. at 320° F.

TABLE II

| Example No.: | Percent diepoxide | Mod. at 300% | Tensile, p.s.i. | Percent elongation |
|---|---|---|---|---|
| 13 | none | 1,040 | 1,915 | 725 |
| 14 | .01 | 1,065 | 1,800 | 650 |
| 15 | .02 | 1,510 | 2,000 | 450 |
| 16 | .03 | 1,360 | 1,870 | 500 |
| 17 | .04 | | 1,305 | 250 |

Samples 13 and 14 were "sticky" on the roll mill and difficult to process while samples 15–17 exhibited good processing characteristics.

Examples 18–22

A series of samples were prepared according to the procedure used in Examples 1–12 except that diglycidyl ether was replaced with various diepoxides at 0.02% concentration. The reaction time was 18 hrs. at 80° C. The polymers were compounded with the vulcanizing ingredients as per above recipe except ISAF black replaced the SRF black and no dibutoxyethyl phthalate was added, and cured 30 minutes at 310° F.

TABLE III

| Diepoxide: | Tensile, p.s.i. | Percent elongation | $ML_{1-4}$* at 250° F. |
|---|---|---|---|
| A | 2,690 | 450 | 94.0 |
| B | 2,450 | 300 | 106.5 |
| C | 1,960 | 500 | 112.5 |
| D | 2,845 | 450 | 82.0 |
| Control | 2,660 | 400 | 77.5 |

*The data tabulated under "$ML_{1-4}$" are the viscosity measurements obtained on the raw elastomers by using a 1.2 inch rotor in a Mooney Plastometer at a sample temperature of 250° F. The Mooney Plastometer conforms to the test condition set forth in ASTM Standards, Part 28, April, 1967, D 1646–63 and is a widely used instrument in the rubber field. The subscript notation, 1–4, indicates that a one minute warm-up was used before the rotor was started and that the viscosity measurement was recorded at the end of four minutes (total).

wherein "A" is a diglycidyl ether of a polyethylene glycol (average molecular weight of the glycol is about 200), "B" is the diglycidyl ether of bisphenol A, "C" is the polyglycidyl ether of a novolac resin wherein the average number of epoxy groups per molecule is 3.6 and "D" is 2,3-dibromo-1,4-diglycidyloxybutane.

We claim:
1. A copolymer prepared by the polymerization of a mixture consisting essentially of (1) 98 to 99.99 percent by weight of a monoepoxide which is at least one alkylene oxide of about 2 to 4 carbon atoms or a glycidyl ether and (2) 0.01 to 2 percent of a polyepoxide.

2. The copolymer defined in claim 1 wherein the monoepoxide is propylene oxide, epichlorohydrin, allyloxypropyl glycidyl ether or a mixture thereof.

3. The copolymer defined in claim 1 wherein the polyepoxide is diglycidyl ether, butadiene diepoxide, pentadiene diepoxide, vinylcyclohexene diepoxide, 1,4 - diglycidyloxy-2,3-dihalobutane,

wherein A is glycidyl, B is hydrogen, methyl or ethyl and x is 1–20, the diglycidyl ether of bisphenol A or the polyglycidyl ether having the formula

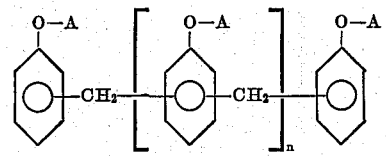

wherein A is glycidyl and the average value of n is 0.2 to 2.

4. The copolymer defined in claim 3 wherein the polyepoxide concentration is 0.01 to 1 percent by weight.

5. The copolymer defined in claim 4 wherein the monoepoxide is at least one of propylene oxide, epichlorohydrin, or allyloxypropyl glycidyl ether.

6. The copolymer defined in claim 5 wherein the polyepoxide is diglycidyl ether.

References Cited

UNITED STATES PATENTS

| 3,135,705 | 6/1964 | Vandenberg | 260—2 |
| 3,231,551 | 1/1966 | Herold | 260—2 |
| 3,385,795 | 5/1968 | Durst | 260—2 |
| 3,415,761 | 12/1968 | Vandenberg | 260—2 |
| 3,446,757 | 5/1969 | Vandenberg | 260—2 |

PAUL LIEBERMAN, Primary Examiner

U.S. Cl. X.R.

260—2, 30.4, 37, 47